United States Patent [19]

Takahashi

[11] Patent Number: 4,960,321

[45] Date of Patent: Oct. 2, 1990

[54] OPTICAL APPARATUS

[75] Inventor: Naomasa Takahashi, Kawasaki, Japan

[73] Assignee: Kabushiki Kaisha Toshiba, Kanagawa, Japan

[21] Appl. No.: 270,327

[22] Filed: Nov. 14, 1988

[30] Foreign Application Priority Data

Nov. 13, 1987 [JP] Japan .................. 62-285475

[51] Int. Cl.⁵ ................................ G02B 7/02
[52] U.S. Cl. ........................ 350/255; 350/247; 369/44.11
[58] Field of Search ............. 350/321, 255, 257, 247, 350/252, 246; 369/45, 44; 248/602, 638

[56] References Cited

U.S. PATENT DOCUMENTS

| 4,596,444 | 6/1986 | Ushida ........................ 350/255 |
| 4,596,448 | 6/1986 | Kikuchi ....................... 350/255 |
| 4,679,904 | 7/1987 | Kurihara ..................... 350/255 |
| 4,720,088 | 1/1988 | Tamura ....................... 350/255 |
| 4,750,164 | 6/1988 | Nose .......................... 350/255 |

FOREIGN PATENT DOCUMENTS

59-221840  12/1984  Japan .

Primary Examiner—Bruce Y. Arnold
Assistant Examiner—Loha Ben
Attorney, Agent, or Firm—Finnegan, Henderson, Farabow, Garrett, and Dunner

[57] ABSTRACT

An optical apparatus for focusing a light beam, in which a supporting device such as rod members supports a directing device such as an object lens for directing the light beam to an optical memory such as an optical or magnetooptical disk, a linking device for flexibly links one end of the supporting device to the directing device, and a holding device for flexibly holds the other end of the supporting device to a fixed member.

12 Claims, 7 Drawing Sheets

OPTICAL APPARATUS

BACKGROUND OF THE INVENTION

1. Field of the Invention

The present invention relates to an optical apparatus for focusing a light beam for use in an optical disk apparatus and, particularly, in a magnetooptical disk apparatus.

2. Description of the Prior Art

In an optical disk apparatus or a magnetooptical disk apparatus, information is stored in an optical memory or information memory medium, such as an optical disk or a magnetooptical disk and is read out thereof to reproduce the same by using an optical pick-up means.

A conventional optical apparatus for focusing a light beam, for use in the optical or magnetooptical disk apparatus, includes a U-shaped base plate and a holding or movable block, movably mounted thereto, for retaining an object lens, as disclosed in Japanese Utility Model Laid-Open Specification No. 59-221840. A focusing coil for driving the movable block in the focusing direction is wound around the side surfaces of the movable block, and two pairs of D-shaped tracking coils for driving the movable block in the tracking direction are attached to the two opposite side surfaces of the movable block. A pair of yokes are provided on the base plate.

A printed circuit board is attached to one side surface of the movable block, and the electric wires of the focusing and tracking coils are connected to the printed circuit board. Another printed circuit board is mounted to one side of the U-shaped base plate, and four electric wire-covered rubber tubes extend between the two printed circuit boards. The U-shaped base plate is made of a magnetic material, and a pair of magnets are mounted to the opposite sides thereof to form a magnetic field, in which the focusing and tracking coils are positioned.

In this embodiment, when electric current is supplied to the focusing coil or the tracking coils through the electric wires, the movable block and the object lens mounted thereto are driven in the focusing or tracking direction by the interaction between the focusing coil or tracking coil and the magnets. As a result of the energization, the wires are flexed and the object lens is displaced in the focosing and tracking directions. Thereby the object lens is held at the track position where the recording or reproducing of information is carried out, even when the information memory medium is distorted or off center.

Since the object lens is displaceably supported by the four wires either in the focusing direction or in the tracking direction in the conventional optical apparatus, the optical apparatus can not stand still quickly due to the inertial force even when the optical apparatus is moved by a transport mechanism in the tracking direction and it is stopped.

As a result, when the optical apparatus is moved by the transport mechanism in the tracking direction, the supporting unit, which is supported by the wires, swings in the tracking direction, thereby resulting in a problem that information can not be recorded or can not be reproduced until the swinging damps out.

Moreover, in the conventional optical apparatus, when the object lens is being displaced in the tracking direction by energizing the tracking coil, part of one side of the focusing coil does not often exist between the magnet and the yoke.

As a result, when the focusing coil is energized in a condition that the object lens is being displaced in the tracking direction, the center of the driving force which is generated by the focusing coil fails to coincide with the center of gravity position of the object lens. Consequently, a moment is generated by impartation of an unequal energizing force to the object lens holding block due to the off-center effect; and the object lens is rotated by the moment, thereby resulting in a coma (aberration) at the focal point of the object lens whereby satisfactory data can not be obtained.

SUMMARY OF THE INVENTION

It is therefore an object of the present invention to provide an optical apparatus for focusing a light beam, free from the aforementioned drawbacks and defects of the prior art, which is capable of preventing the object lens from swinging when a coarse track access is carried out, and preventing the object lens from being tilted when it is being displaced in the tracking direction and even when the focusing coil is energized.

In accordance with one aspect of the invention, there is provided an optical apparatus for focusing a light beam, comprising means for directing the light beam onto an optical memory, means for rigidly supporting the directing means, means for flexibly linking one end of the supporting means to the directing means, and means for flexibly holding the other end of the supporting means.

In accordance with another aspect of the invention, there is provided an optical apparatus for focusing a light beam, comprising means for directing the light beam onto an optical memory, means for rigidly supporting the directing means, means for flexibly linking one end of the supporting means to the directing means to be movable in a predetermined direction, and means for flexibly holding the other end of the supporting means to be movable in the predetermined direction.

BRIEF DESCRIPTION OF THE DRAWINGS

These and other objects, features and advantages of the present invention will more fully appear from the following description of the preferred embodiment with reference to the accompanying drawings, in which.

DETAILED DESCRIPTION OF THE PREFERRED EMBODIMENTS

Figure 1:
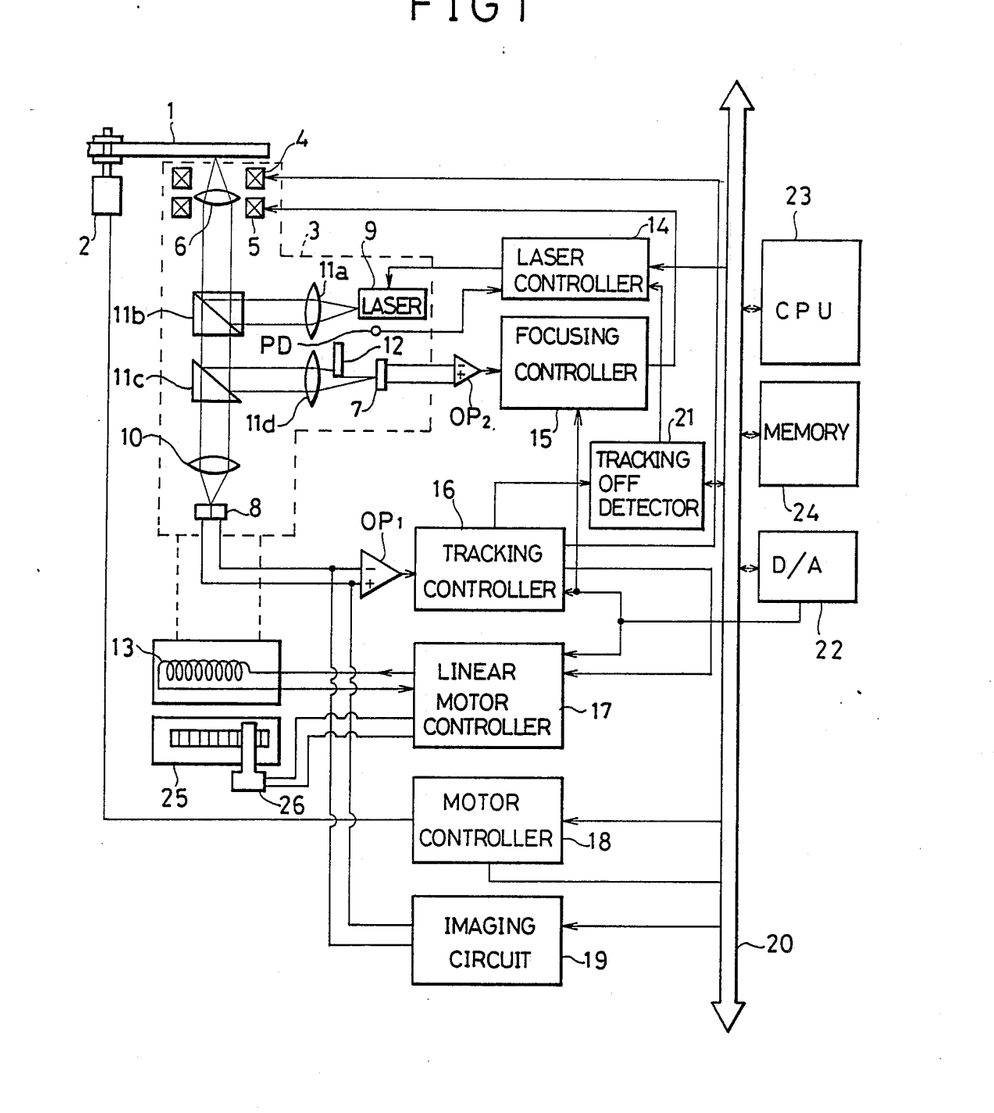
FIG. 1 is a block diagram showing a disk apparatus including an optical apparatus for focusing a light beam according to the present invention.

Referring now to the drawings, there is shown in FIG. 1 an optical disk apparatus, i.e., information processor including one embodiment of an optical apparatus for focusing a light beam according to the present invention. On the surface of an optical memory or an information memory medium such as an optical disk 1, there is formed a spiral groove, i.e., memory tracks. The optical disk 1 is rotated by a motor 2 at, for instance, a constant speed. The motor 2 is controlled by a motor controller 18.

Figure 2:
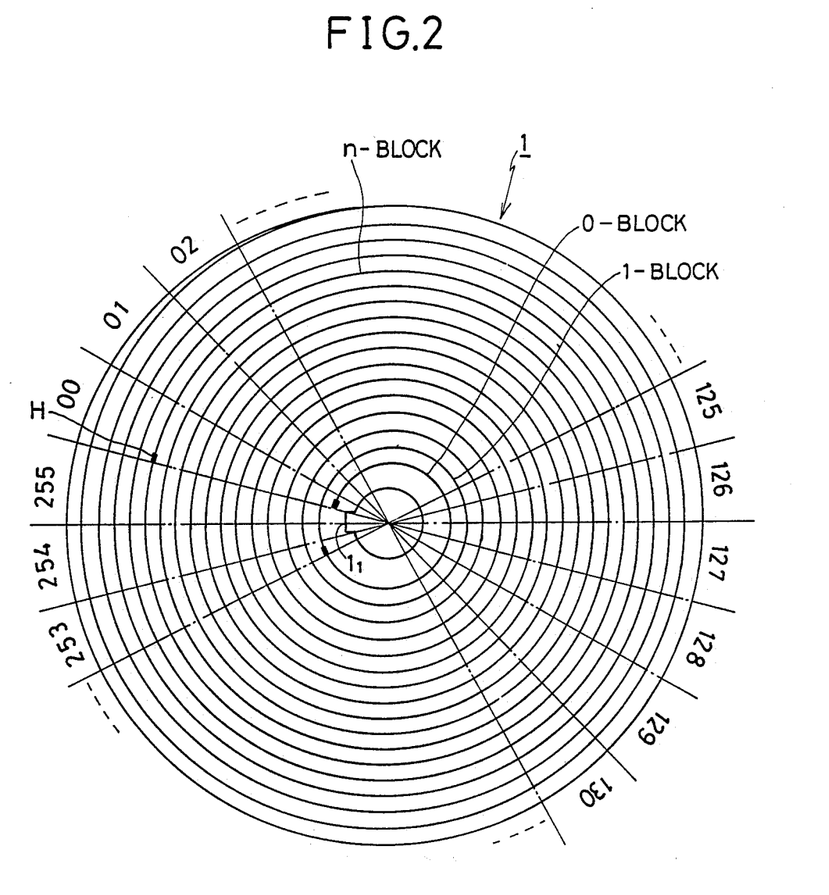
FIG. 2 is a plan view of an optical disk shown in FIG. 1.

As shown in FIG. 2, the surface of a circular substrate of the optical disk 1 made of a material such as plastic or glass is coated, with a metal layer, namely recording film, such as tellurium (Te) or bismuth (Bi) in a doughnut form and in the vicinity of center of the metal coated layer, there is provided a notch, i.e., a reference position mark $1_1$. The surface of the optical disk 1 is divided into 256 sectors from 0 to 255, with the reference mark $1_1$ being 0, as shown in FIG. 2. Information having variable lengths is reordered on the optical disk over a plurality of blocks, for instance, 300,000 blocks on 36,000 tracks.

The number of sectors in one block on the optical disk amounts to for instance, 40 sectors in the inside and to 20 sectors in the outside. Each of block headers consisting of block numbers, track numbers and the like is recorded at each starting position on the optical disk, when manufacturing the same.

When each block is not terminated at the changing position of each sector on the disk 1, a block gap is provided so that each block necessarily starts from the changing position of the sector.

The recording and reproducing of information on the disk 1 is carried out by an optical head 3. The optical head 3 is fixed to a drive coil 13 which constitutes a movable portion of a linear motor. The drive coil 13 is connected to a linear motor controller 17. A linear motor position detector 26 is connected to the linear motor controller. The detector 26 produces a position signal when an optical scale 25 provided at the optical head 3 is detected.

The fixed portion of the linear motor is provided with a permanent magnet (not shown) and the optical head 3 is moved in the radial direction of the optical disk 1 when the drive coil 13 is energized by the linear motor controller 17. An object lens 6 is supported by a wire or a plate spring within the head 3. The object lens 6 is moved by a focusing drive coil 5 in the focusing direction, i.e., in the direction of the optical axis of the lens and it can also be moved by a tracking drive coil 4 in the tracking direction, i.e., the orthogonal direction to the optical axis of the lens. The laser light beam generated by a semiconductor laser 9 driven by a laser controller 14 is radiated on the optical disk 1 through a collimater lens 11a, a half prism 11b, and the object lens 6.

The reflected light beam from the disk 1 is led to a half prism 11c through the object lens 6 and the half prism 11b. One beam branched by the half prism 11c is led to a pair of tracking position sensors 8 through a focusing lens 10. The other light beam branched by the half prism 11c is led to a pair of focus position sensors 7 through a focusing lens 11d and a knife edge 12.

An output signal from the tracking position sensors 8 is applied to a tracking controller 16 through a differential amplifier OP1. A tracking error signal produced by the tracking controller 16 is applied to the linear motor controller 17 and to the drive coil 4 in the tracking direction in such a manner that the laser beam is controlled to be traced on predetermined tracks on the optical disk 1.

Furthermore, a signal relating to the focus point of the laser beam is produced from the focus position sensors 7 and it is applied to a focusing controller 15 through a differential amplifier OP2. An output signal from the focusing controller 15 is then applied to a focusing drive coil 5 and the laser beam is controlled so as to be always just focussed on the optical disk 1. The output sum signal from the tracking position sensors 8 when the focusing and tracking of the beam are carried out, is reflected with concave and convex conditions of each pit i.e., recorded information, formed on the tracks. The output signals from the sensors 8 are then applied to an imaging circuit 19, where image information and address information such as track numbers, sector numbers are reproduced.

The tracking controller 16 moves the object lens 6 in accordance with a track jump signal supplied from a CPU 23 through a D/A convertor 22, thereby moving the beam for one track.

The laser controller 14, the focusing controller 15, the tracking controller 16, the linear motor controller 17, the motor controller 18, and the image circuit 19 and the like are controlled by the CPU 23 through a bus 20. The CPU 23 operates in accordance with programs stored in a memory 24. Moreover, in the disk apparatus, there is provided a D/A convertor 22 for sending and receiving information between the focusing controller 15, tracking controller 16, linear motor controller 17 and the CPU 23.

Figure 3:
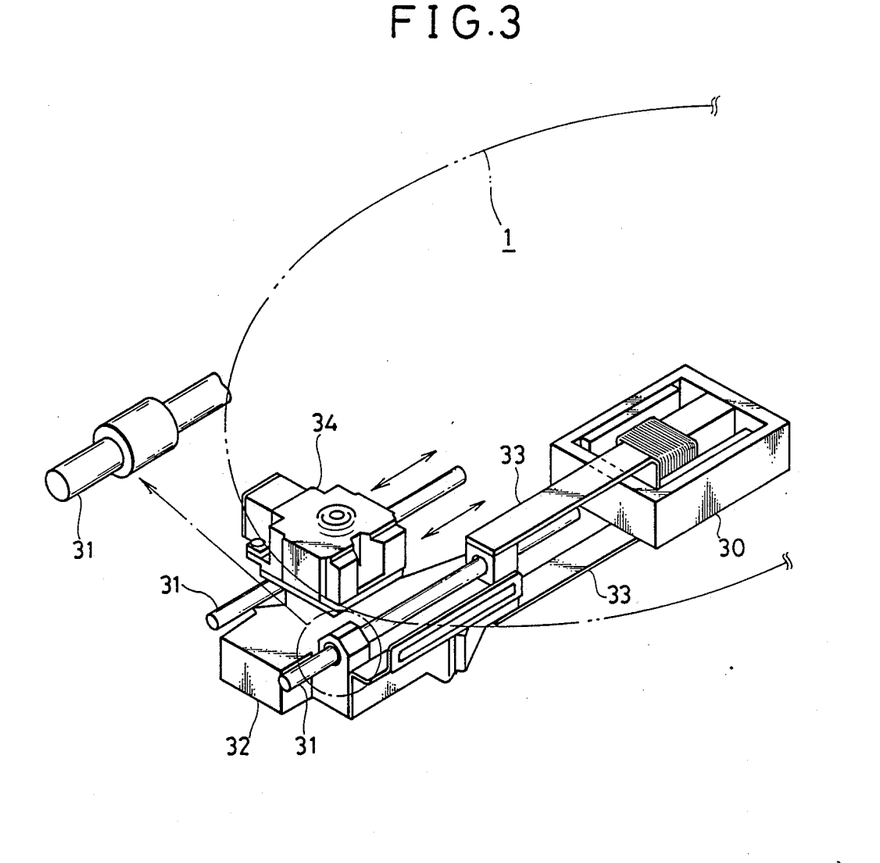
FIG. 3 is a perspective view of one example of a transport mechanism for moving pick-up means shown in FIG. 1.

FIG. 3 shows a perspective view of one example of a transport mechanism for moving the optical pick-up means shown in FIG. 1 in the tracking direction.

The transport mechanism is comprised of a linear motor 30 for generating a driving power, two guide shafts 31, arranged along the tracking direction, a movable block 32 which is slidably mounted to the guide shafts and arms 33, for displacing the movable block in the tracking direction by the driving force obtained by the linear motor 30. When a forward signal or reverse signal is supplied, the movable block 32 is displaced by the driving of the motor 30 and an optical apparatus 34 fixed on the movable block 32 is also displaced to a track position designated by the forward signal and reverse signal, that is, to the track position where the recording or reproducing of information is carried out.

Figure 4:
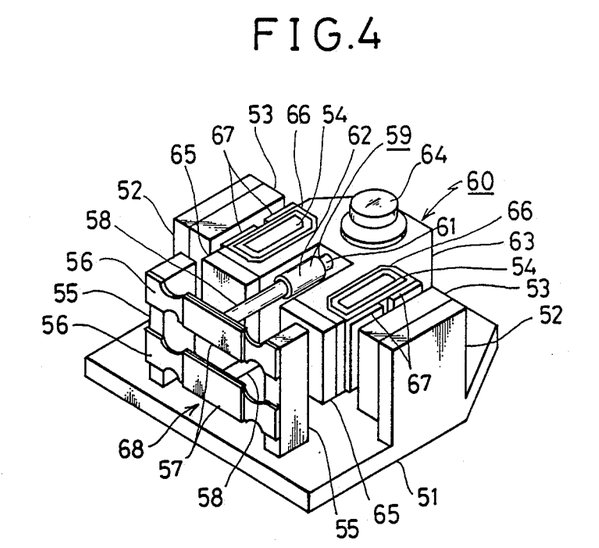
FIG. 4 is a perspective view of one embodiment of the optical apparatus according to the present invention.

FIG. 4 shows a perspective view of one embodiment of the optical apparatus according to the present invention.

The optical apparatus in the figure is comprised of a base plate 51, a pair of outer yokes 52 vertically provided in opposite to the both sides of the base plate 51, magnets 53 each mounted to each inside of the yokes 52, a pair of inner yokes 54 vertically provided in opposite positions near the center of the base plate 51, two supporting members 55 vertically provided at the rear side of the base plate 51, two plate springs 56, 56 which are bridged in parallel between the supporting members 55, a support rod 58 one end of which is fixed at the center 57 of each of the plate springs 56, a linkage 59 formed in the other end of the support rod 58, and an object lens unit 60 supported by the linkage 59.

The supporting members 55 are fixed members. The plate springs 56 constitute flexibly holding means, the support rods 58 constitute rigidly supporting means, the linkages 59 constitute flexibly linking means, and the object lens unit 60 and the like constitute directing means.

Figure 5:
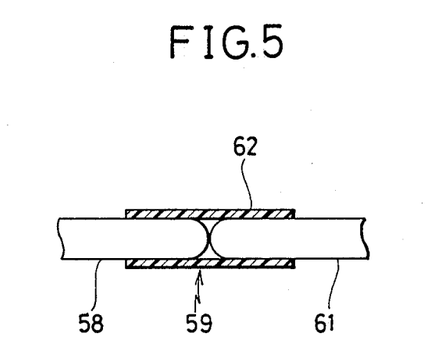
FIG. 5 is a detailed cross-sectional view of a link portion in the supporting unit shown in FIG. 4.
Figure 6:
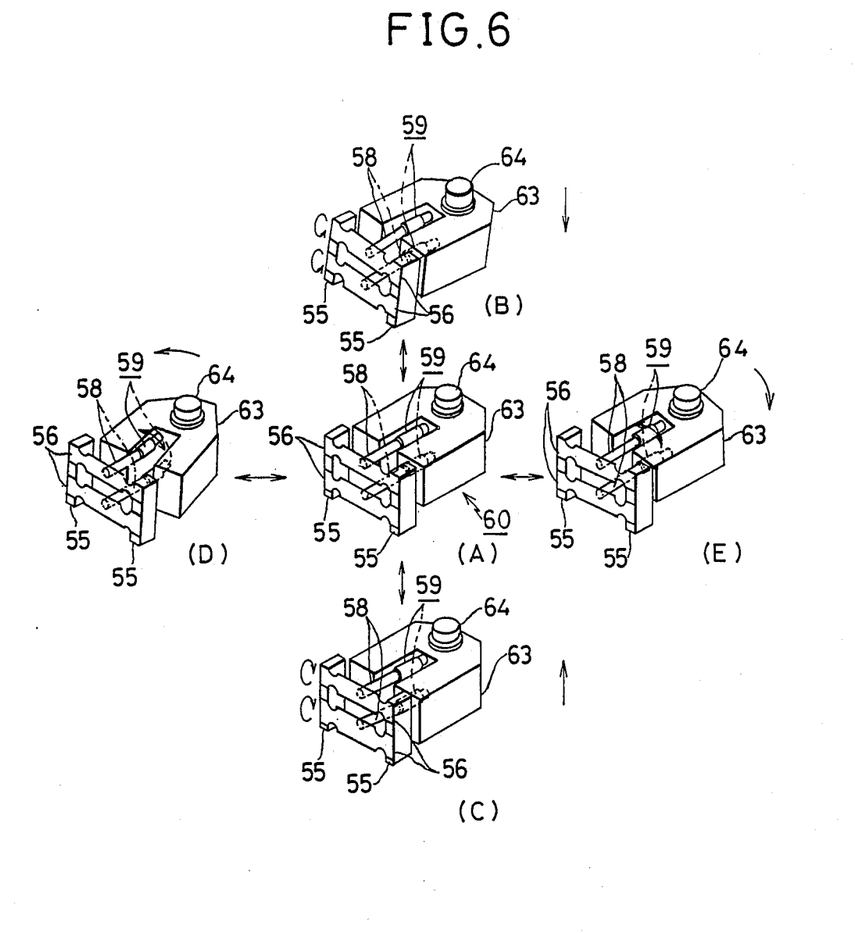
FIG. 6 illustrates each of the operating modes of the apparatus according to the present invention.

In this case, each of the plate springs made of such as beryllium, copper, stainless steel is fixed to each supporting member 55 with a predetermined tension, the center 57 of the plate spring 56 is never displaced in the tracking direction, even when a force is applied to the object lens unit 60 in the tracking direction. In addition, since both ends of each plate spring is formed slightly thin, the side portions of the plate springs are twisted and the support rod 58 is tilted in the focusing direction, when a force is applied to the object lens unit 60 in the focusing direction. Moreover, the linkage 59 provided at one end of the support rod 58 allows the end of the support rod 58 and one end of a linkage rod 61 fixed to the object lens unit 60 to be contacted flexibly as shown in FIG. 5. After the contacted portions of rods 58 and 61 are covered by a resin pipe 62, and the support rod 58 and the linkage rod 61 are bonded by an adhesive to resin pipe 62 as to resin-force them. When the object lens unit 60 is not energized in the tracking direction or in the focusing direction, the support rod 58 and the linkage rod 61 are maintained generally at a straight line relationship as shown in FIG. 6(A). In this condition, when the object lens unit 60 is energized in the tracking direction, the object lens unit 60 is displaced with the linkage 59 being centered as shown in FIGS. 6(D) and 6(E).

On the other hand, when the object lens unit 60 is energized in the focusing direction, the plate spring 56 is twisted, while the linkage 59 is flexed, thereby displacing the object lens unit 60 in the focusing direction, as shown in FIGS. 6(B) and 6(C). In this case, since each plate spring 56, each support rod 58, and each linkage 59 constitute a parallel link mechanism 68, the object lens unit 60 is displaced in the focusing direction, with the optical axis direction being maintained constant.

Moreover, the object lens unit 60 is comprised of an object lens holding block 63 generally in the form of "U" in its cross-section, an object lens 64 to be mounted to one end of the holding block 63, a counter weight 65 to be mounted at both sides of the holding block 63, a pair of focusing coils 66, 66 fixed at each of concave inner walls formed at both sides of the holding block 63 and two pairs of tracking coils 67 fixed at the outside surface of the focusing coil 66, as shown in FIG. 4.

In this case, the counterweights 65 are for adjusting the center of gravity position of the object lens unit 60, and their weights are set in such a manner that the center of gravity position of the object lens unit 60 is coincident with, and thus balances the unit 60 with respect to, the flexed center position of the linkage 59.

Figure 7:
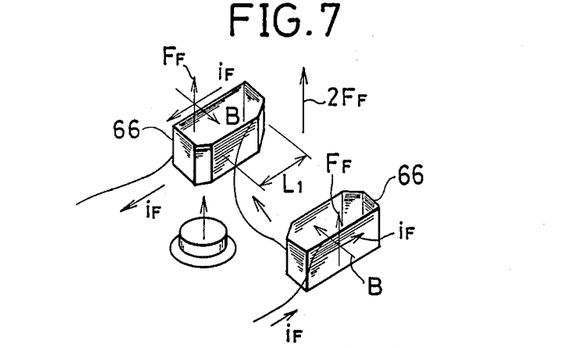
FIG. 7 illustrates a model of the one operation for explaining an energization force by the focusing coils shown in FIG. 4.

Each of the focusing coils 66 is formed point-symmetric with the linkage 59 being centered, and, when a focusing current $i_F$ is supplied thereto through the support rod 58, an energization force $F_F$ is generated in the focusing direction by a magnetic field B generated between the inner yoke 54 and the magnet 53, as shown in FIG. 7.

Figure 8A:
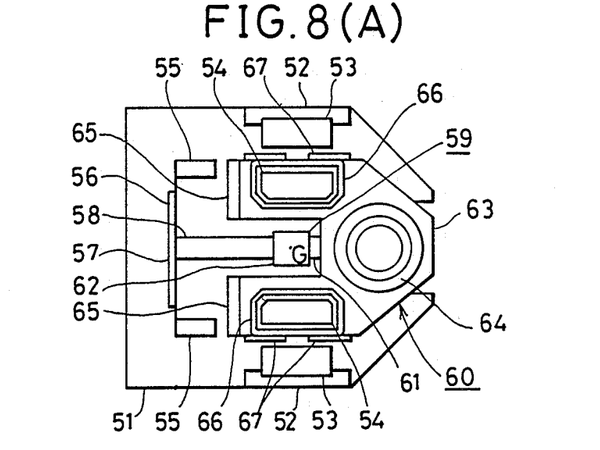
FIG. 8(A) is a plane view for explaining the focusing operation of the apparatus according to the present invention.
Figure 8B:
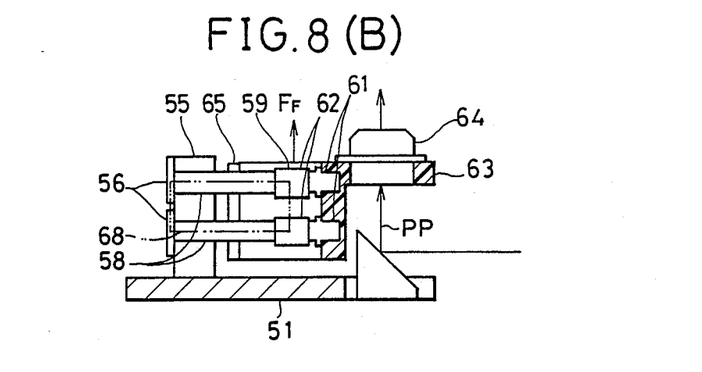
FIG. 8(B) is a cross-sectional view of the focusing operation of the apparatus according to the present invention.

The energization force $F_F$ is sought from the following equation;

$$F_F = i_F \cdot B \cdot L_1 \cdot \sin\theta \tag{1}$$

where
$L_1$ = Length of the focusing coil 66 within the magnetic field B
$\theta$ = Angle between the direction of that length of the focusing coil 66 and the magnetic field B In the present embodiment, since $\theta$ is normally $\theta = 90°$, $\sin\theta = 1$. In this case, since the two focusing coils 66 are provided so that the linkage 59 becomes point symmetrically centered around the linkage 59, the length $L_1$ effective for each of the focusing coils 66 remains constant, and so does the angle $\theta$, even when the object lens unit 60 is rotated about a point in linkage 59. Consequently, even when the object lens unit 60 is pivotally moved around the linkage 59, an equal energization force $F_F$ is generated in each of the focusing coils 66, upon supply of the focusing current $i_F$. As a result, the object lens unit 60 is displaced in the focusing direction as shown in FIGS. 8(A) and 8(B) by the action of a sum force including each energization force. In this case, since the object lens unit 60 is supported by the parallel link mechanism 68, the optical axis of the object lens 64 is always maintained in parallel with the optical axis PP.

Figure 9:
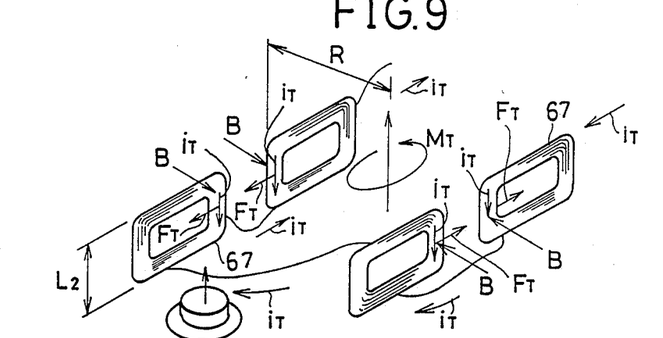
FIG. 9 is a model for explaining the energization force by the tracking coils of the apparatus shown in FIG. 4 according to the present invention.

In addition, the tracking coil 67 is point-symmetric centering around the linkage 59 at the part exposed in the magnetic field B, so that when the tracking current $i_T$ is supplied through the support rod 58, an energization force $F_T$ is generated in the tracking force by the action of the magnetic field B, as shown in FIG. 9. The energization force $F_T$ is sought by the following equation;

$$F_T = i_T \cdot B \cdot L_2 \tag{2}$$

where $L_2$ = Length of the tracking coil 67 within the magnetic field B.

Since the two tracking coils 67, 67 are formed as a point symmetric centering around the linkage 59, the length $L_2$ of each tracking coil 67 in the magnetic field B remains always equal to each other even when the object lens 60 is displaced in the tracking direction. As a result, even when the object lens unit 60 is displaced in the tracking direction, the equal energization force $F_T$ is generated in each of the tracking coils 67 upon supply of the tracking current $i_T$ thereto and a rotational moment $M_T$ is generated by the energization force $F_T$ as follows;

$$M_T = 4F_T R \tag{3}$$

where R = Distance between part of each tracking coil 67 within the magnetic field B and the linkage 59.

Figure 10A:
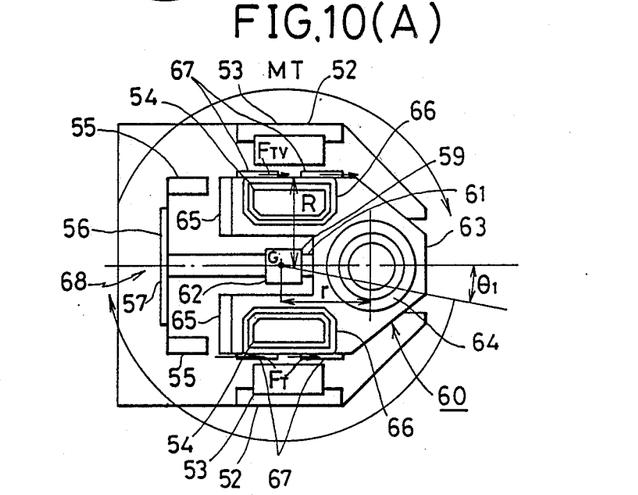
FIG. 10(A) is a plan view for explaining the tracking operation of the apparatus according to the present invention.
Figure 10B:
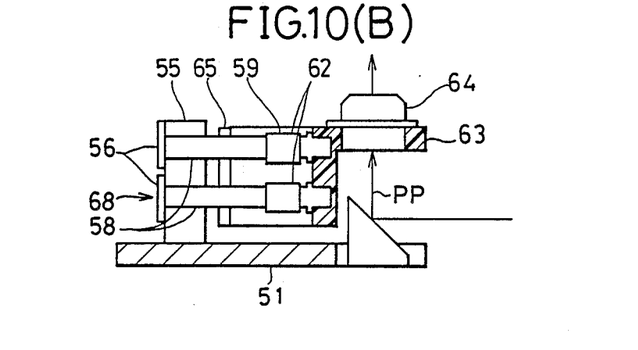
FIG. 10(B) is a cross-sectional view for explaining the tracking operation of the apparatus according to the present invention.

Consequently, the object lens unit 60 is moved in the tracking direction by the rotational movement $M_T$ centering around the linkage 59 as shown in FIGS. 10(A) and 10(B) and the object lens 64 provided at the end of the object lens holding block 63 is displaced by distance $A = r \cdot \theta 1$ in the tracking direction, where r indicates the distance between the linkage 59 and the object lens 64.

In this embodiment, since the center of the plate spring 56 is constructed so as not to be displaced in the tracking direction while the center of gravity position of the object lens unit 60 is coincident with the center of bending of the linkage 59 (see FIG. 3), the object lens unit 60 is never rotated even when the optical apparatus is moved in the tracking direction. Accordingly, even when a rapid track access is carried out, the object lens 60 can be prevented from swinging, thereby enabling data to be recorded or reproduced immediately after termination of the track access.

In this case, since the linkage 59 itself acts as a damper, the object lens unit 60 can be prevented from swinging without provision of any particular damper mechanism.

Moreover, in the foregoing embodiment, since the plate spring 56 is used, time delay can be prevented from occurring as in the case of a sliding bearing, thereby improving its response. Also, since anisotropy is easily applied to the plate spring 56 in this case, conventional plate springs can be used, thereby reducing the production cost.

Moreover, in the embodiment according to the present invention, since the object lens unit 60 is supported by a relatively thick support rod 58, the use of thin wires can be avoided, unlike the one according to the prior art. As a result, a thin hole working to the object lens unit 60 is not required, as well as dispensing with precision tools, which otherwise necessitated for assembling the same.

As has been described above, according to the present invention, the optical means can be prevented from swinging when access to the tracks is performed, while the optical axis thereof can always be maintained constant, so as not to tilt the optical means being, by the energization of the focusing coils when the optical means is displaced in the tracking direction.

In addition, since the optical means is displaceably held at the other end of the support rod by holding means, the optical means can be displaced in the direction perpendicular to the optical axis of the optical means, i.e., in the tracking direction.

With the construction described above, the generation of swinging due to the inertial force which otherwise occurs in the supporting unit according to the prior art, can be obviated even when the optical apparatus as a whole is moved in the tracking direction.

Although the two plate springs 56, two support rods 58, the two linkages 59 and the two linkage rods 61 are provided in the preferred embodiment described above, however, only single number of these members may be, of course, possible according to the present invention.

Although the present invention has been described in its preferred embodiment with reference to the accompanying drawings, it is readily understood that the present invention is not restricted to the preferred embodiment and that various changes and modifications may be made in the present invention by a person skilled in the art without departing from the spirit and scope of the present invention.

What is claimed is:

1. An optical apparatus for focusing a light beam, comprising:
   means for directing the light beam onto an optical memory; and
   means for supporting the directing means, said supporting means including:
   an elongated member having two ends;
   means for linking one end of the elongated member to the directing means for limited rotation of the directing means about a particular point, the linking means including the particular point; and
   means for flexibly holding the other end of the elongated member with respect to focusing movement of the directing means.

2. The apparatus of claim 1, wherein the supporting means, the linking means and the holding means include at least two elongated members, at least two linking members and at least two second holding members, respectively, each pair of members being approximately parallel to each other.

3. The apparatus of claim 2, wherein each elongated member comprises a rod member, each linking member comprises a flexible tubular member, and each holding member comprises a plate spring.

4. The apparatus of claim 1, wherein the linking means is provided generally near the particular point, the linking means further comprising a flexible portion encompassing the particular point and a relatively rigid portion between the flexible portion and the directing means.

5. The apparatus of claim 1, wherein the optical apparatus also includes a counter weight for adjusting balance of the directing means about the particular point.

6. An optical apparatus for focusing a light beam, comprising:
   means for directing the light beam onto an optical memory; and
   means for supporting the directing means, said supporting means including:
   an elongated member having two ends; means for linking one end of the elongated member to the directing means to permit the directing means to be movable about a particular point at least in a predetermined direction, the linking means including the particular point;
   means for flexibly holding the other end of the elongated member; and
   additional means for supporting all of the aforesaid means to limit motion orthogonal to said predetermined direction, said additional supporting means comprising at least one extended member disposed in a plane lying parallel to the predetermined direction.

7. The apparatus of claim 6, wherein the linking means and the at least one extended member are movable in a focusing direction, being orthogonal to the predetermined direction.

8. The apparatus of claim 6, wherein the linking means and the at least one extended member are movable in a tracking direction, being the predetermined direction.

9. The apparatus of claim 6, wherein the supporting means, the linking means and the holding means include at least two elongated members, at least two linking members and at least two second holding members, respectively, each pair of members being approximately parallel to each other.

10. The apparatus of claim 9, wherein each elongated member comprises a rod member, each linking member comprises a flexible tubular member, and each holding member comprises a plate spring.

11. The apparatus of claim 6, wherein the linking means is provided generally near a midpoint of the supporting means, the supporting means thereby comprising two portions at least one of which is displaceable relative to a fixed member.

12. The apparatus of claim 6, wherein the optical apparatus also includes a counterweight for adjusting balance of the directing means.

* * * * *

UNITED STATES PATENT AND TRADEMARK OFFICE
CERTIFICATE OF CORRECTION

PATENT NO. : 4,960,321
DATED : October 02, 1990
INVENTOR(S) : Naomasa Takahashi

It is certified that error appears in the above-identified patent and that said Letters Patent is hereby corrected as shown below:

Column 5, line 31, after "5", begin a new paragraph (i.e., with "After").

Column 5, line 34, before "as" insert --so--.

Column 5, line 34, change "resin-force" to --reinforce--.

Column 6, line 65, change "movement" to --moment--.

Signed and Sealed this

Twentieth Day of April, 1993

*Attest:*

*Attesting Officer*

MICHAEL K. KIRK

Acting Commissioner of Patents and Trademarks